United States Patent
Sanders et al.

(10) Patent No.: US 10,429,187 B1
(45) Date of Patent: Oct. 1, 2019

(54) APPARATUS AND METHOD FOR OPTICAL POWER CONTROL

(71) Applicant: Honeywell International Inc., Morris Plains, NJ (US)

(72) Inventors: Glen A. Sanders, Scottsdale, AZ (US); Lee K. Strandjord, Tonka Bay, MN (US); Neil A. Krueger, Saint Paul, MN (US); Edward Summers, Glendale, AZ (US); Clarence Eugene Laskoskie, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/121,317

(22) Filed: Sep. 4, 2018

(51) Int. Cl.
*H04B 10/00* (2013.01)
*G01C 19/64* (2006.01)
*H04J 14/00* (2006.01)

(52) U.S. Cl.
CPC .................................. *G01C 19/64* (2013.01)

(58) Field of Classification Search
CPC ...... G01C 19/64; G01C 19/66; G01C 19/661; G01C 19/72; G01C 19/721; G01C 19/727
See application file for complete search history.

(56) References Cited

U.S. PATENT DOCUMENTS

| 4,673,293 | A | 6/1987 | Sanders |
| 7,844,152 | B2 | 11/2010 | Sanders |
| 8,213,018 | B2 | 7/2012 | Smith et al. |
| 8,947,671 | B2 | 2/2015 | Strandjord et al. |
| 2010/0290057 | A1* | 11/2010 | Qiu ..................... G01C 19/727 356/461 |
| 2011/0019198 | A1* | 1/2011 | Sanders ............... G01C 19/727 356/461 |

FOREIGN PATENT DOCUMENTS

CN          103335642 B    6/2016

* cited by examiner

*Primary Examiner* — Daniel G Dobson
(74) *Attorney, Agent, or Firm* — Fogg & Powers LLC (57) ABSTRACT

A method comprises: receiving a first optical signal and a second optical signal; injecting a portion of the first optical signal into an optical resonator; injecting a portion of the second optical signal into the optical resonator, where the first optical signal and the second optical signal propagate in opposite directions in the optical resonator; emitting a portion of the first optical signal; emitting a portion of the second optical signal; coupling, by free space optics, a portion of the emitted first optical signal to a first power detector; coupling, by free space optics, a portion of the emitted second optical signal to a second power detector; adjusting the power level of the received first optical signal based upon a first detected power level detected by the first power detector; and adjusting the power level of the received second optical signal based upon a second detected power level detected by the second power detector.

20 Claims, 4 Drawing Sheets

APPARATUS AND METHOD FOR OPTICAL POWER CONTROL

STATEMENT REGARDING FEDERALLY SPONSORED RESEARCH OR DEVELOPMENT

This invention was made with Government support under Government Contract # Ordnance Technology Base Agreement No. 2016-316, Ordnance Agreement No. 1 awarded by DOTC. The Government has certain rights in the invention.

BACKGROUND

Resonant fiber optic gyroscopes (RFOGs) have greater signal to noise sensitivity for rotation sensing ("rotation sensitivity") for a given diameter than laser ring gyroscopes and interferometer fiber optic gyroscopes. Thus, RFOGs are desirable because a given level of signal-to-noise sensitivity to rotation rate can be achieved with smaller RFOGs, reducing the size of inertial navigation systems incorporating RFOGs. RFOGs, however, are susceptible to bias error because of imperfections in RFOG optical components, e.g. lasers, and RFOG control and signal processing errors.

One source of bias error arises due to variations in a differential power level of the optical signals propagating in an optical resonator in each of the clockwise and counter-clockwise paths. Because a conventional optical resonator coil of an RFOG is made from glass fiber, if the differential power level varies, then—due to the Kerr effect—a difference in index of refraction is created in the two propagation paths. This creates undesirable bias error in the RFOG measurements.

To address this problem, the power levels of the optical signals are controlled. Conventionally, this has been done by extracting a portion of each of the clockwise and the counter-clockwise optical signals emitted from the optical resonator coil by coupling the light into polarizing maintaining (PM) optical fibers prior to detection. The portions may be extracted by optical circulators after coupling into the PM optical fibers, each of which is coupled to a power detector. The PM optical fibers are also used to couple the clockwise and counter clockwise optical signals into the optical resonator. The extracted portions and inputted signals also pass through polarizers.

Rotational misalignments of the PM fiber cause each portion to be launched into and propagate through the PM optical fiber as two components having different polarizations. The polarization of the two components becomes out of phase before the components are incident on the circulator, which contains a polarizer or polarization sensitive elements. Because the polarizer attenuates one of the polarization components, the portion incident upon each power detector is no longer representative of the power level of the corresponding optical signal propagating in the optical resonator. Thus, the measurements of the power detectors are erroneous, due to "polarization misalignment" and subsequent polarization filtering. As a result, bias error from variations in the power levels of the optical signals propagating in the optical resonator is not satisfactorily diminished, and may even be increased due to erroneous indications that the power has changed in resonator (and feedback based on erroneous indications). In addition, coupling of the light into the PM optical fiber may vary, especially over temperature, due to tight spatial alignment tolerances ("spatial misalignment"). This would also cause erroneous indication that optical power circulating in the optical resonator has changed, when it has not.

SUMMARY

A method is provided. The method comprises: receiving a first optical signal and a second optical signal; injecting a portion of the first optical signal into an optical resonator so that the portion of the first optical signal propagates in a first direction through the optical resonator; injecting a portion of the second optical signal into the optical resonator so that the portion of the second optical signal propagates in a second direction through the optical resonator, which is opposite to the first direction; emitting a portion of the first optical signal propagating in the first direction in the optical resonator; emitting a portion of the second optical signal propagating in the second direction in the optical resonator; coupling, by free space optics, a portion of the emitted first optical signal to a first power detector; coupling, by free space optics, a portion of the emitted second optical signal to a second power detector; detecting, with the first power detector, a power level of at least a portion of the coupled first optical signal; detecting, with the second power detector, a power level of at least a portion of the coupled second optical signal; adjusting the power level of the received first optical signal; and adjusting the power level of the received second optical signal.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

Extracting the portions of the clockwise and counter clockwise optical signals from the optical resonator without the use of optical fiber, or polarization sensitive elements, may be used to overcome the above referenced problem. Free space optical transmission is used. Therefore, the effect of fiber misalignment (spatial and polarization) is eliminated. Free space optical transmission means transmission of optical signals in free space, e.g. in air, other gas(es), or a vacuum, without the use of waveguide. Most, or all, of the each extracted optical signal is incident upon the aperture of a corresponding power detector of sufficiently large area to capture substantially all of the light. As a result, each power detector more accurately measures the power levels corresponding to the optical signals propagating in the optical resonator. The detected power levels of the portions of the clockwise and counter clockwise optical signals are thus each stable, e.g. to within between one to one hundred parts per million. The differential detected power level with respect to both portions is commensurately accurate and stable. As a result, bias error described above is diminished.

Figure 1:
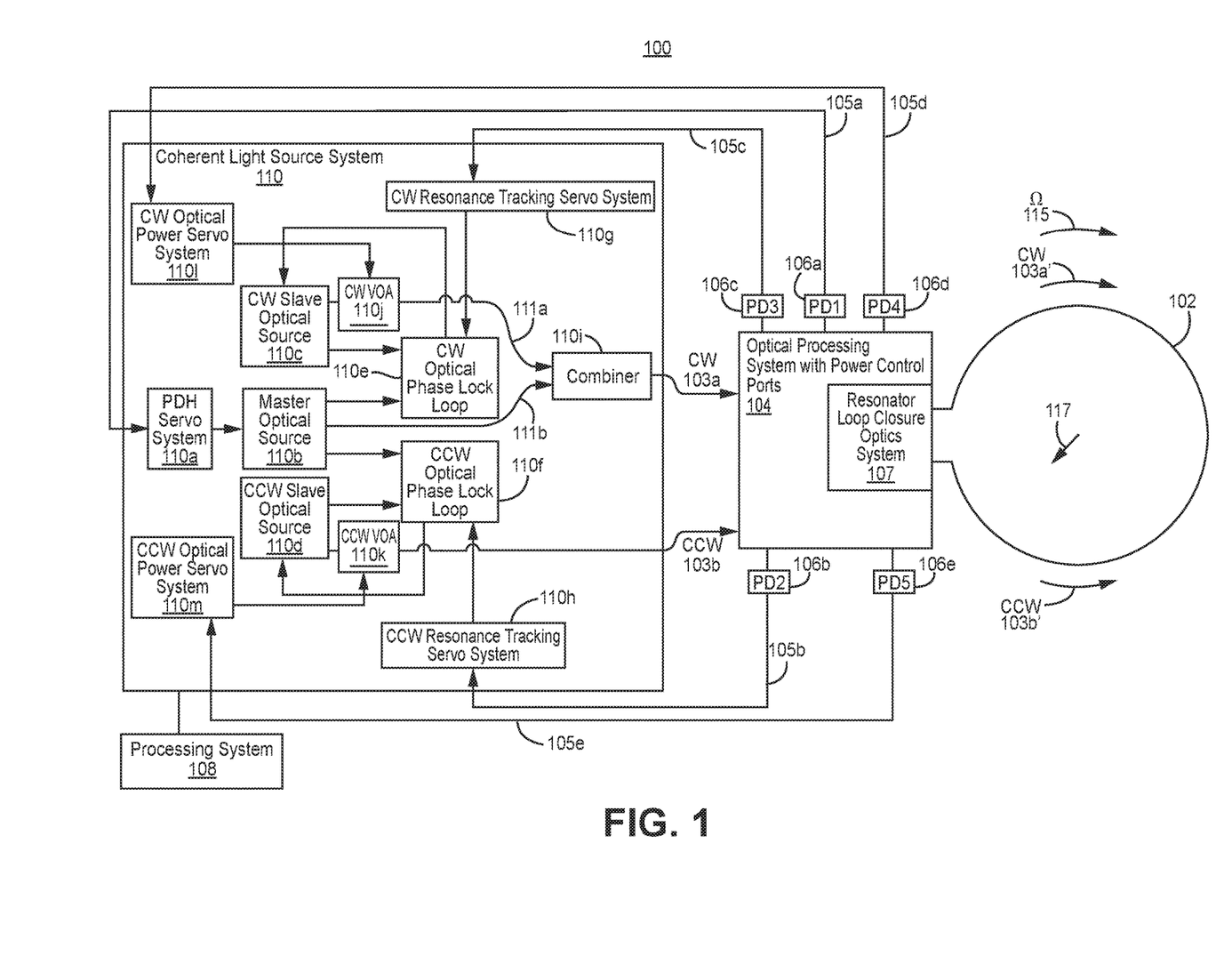
FIG. 1 illustrates a block diagram of one embodiment of a resonant fiber optic gyroscope with an optical processing system with power control ports.

FIG. 1 illustrates a block diagram of one embodiment of an RFOG with an optical processing system with power control ports 100. The embodiment of FIG. 1 is but one RFOG architecture in which the present invention can be implemented.

In the illustrated embodiment, the RFOG with an optical processing system with power control ports 100 includes an optical resonator coil 102, an optical processing system with power control ports 104, a first photodetector (PD1) 106a, a second photodetector (PD2) 106b, a third photodetector (PD3) 106c, a fourth photodetector (PD4) 106d, a fifth photodetector (PD5) 106e, a coherent light source system 110, and a processing system 108. As will be subsequently described, one or more of the photodetectors may optionally be part of the optical processing system with power control ports 104.

The optical resonator coil 102 has a first port and a second port. The first port and the second port of the optical resonator coil 102 are coupled to the optical processing system with power control ports 104. The optical processing system with power control ports 104 includes a resonator loop closure optics system 107. An optical resonator comprises the optical resonator coil 102 and the resonator loop closure optics system 107.

In one embodiment, the optical resonator coil 102 is comprised of turns or windings of optical fiber. The first photodetector 106a, the second photodetector 106b, the third photodetector 106c, and the coherent light source system 110 are coupled to optical processing system with power control ports 104.

Photodetectors convert incident optical signals into electrical signals. The amplitude of the electrical signal generated by a photodetector is linearly related to the intensity of the incident optical signal. Although five photodetectors are exemplified herein, other embodiments of the RFOG with an optical processing system with power control ports may have six photodetectors, and the coherent light source system 110 would be alternatively implemented with two Pound-Drever-Hall (PDH) servo systems as illustrated, for example, in U.S. Pat. No. 8,947,671 (the '671 patent) which is incorporated by reference herein in its entirety. The optional sixth photodetector (PD6) is referenced by way of example elsewhere herein. However, in other embodiments of the RFOG with an optical processing system with power control ports 100 illustrated in FIG. 1, the optional sixth photodetector can be used for diagnostic purposes. The '671 patent also illustrates an alternative implementation of a coherent light source system 110.

In one embodiment, the processing system 108 is a state machine. In another embodiment, the processing system comprises a processor circuitry coupled to memory circuitry. The processing circuitry may be implemented with at least one of a microprocessor, a microcontroller, an application specific integrated circuit, and/or a gate array. The memory circuitry may be implemented by at least one of random access memory, read only memory, Flash memory, magnetic memory such as a hard drive, and/or optical memory such as an optical drive and optical disc. The processing circuitry may execute software and/or firmware stored in the memory circuitry, e.g. to determine angular rate of rotation.

The processing system 108 determines the angular rate of rotation of the optical resonator coil 102 by processing signals from the coherent light source system 110. The memory may include program instructions which are executed by the processor to determine the angular rate of rotation 115 of the optical resonator coil 102 about an input axis 117. The angular rate of rotation 115 is determined by the difference between the resonant frequencies of the optical resonator in the clockwise and counterclockwise directions. This is measured by locking the frequencies, $f_{cw}$ and $f_{ccw}$, of the clockwise (CW) slave optical signal (or first optical signal) 111a and the counter clockwise (CCW) slave optical signals 103b (or second optical signal) to the CW and CCW resonances, respectively, of the optical resonator. Thus, the processing system 108 uses a frequency difference, $\Delta f$, between the frequency, $f_{cw}$, of the CW slave optical signal and the frequency, $f_{ccw}$, of the CCW slave optical signal to derive the rotation rate output of the optical resonator, e.g. the RFOG with an optical processing system with power control ports 100.

In the illustrated embodiment, the first optical signal 111a is combined with a master optical signal (or second optical signal) 111b in an optical combiner (combiner) 110i prior to being coupled to the optical processing system with power control ports 104, and then to the optical resonator coil 102. The CCW slave optical signal 103b is also coupled to the optical processing system with power control ports 104 and the optical resonator coil 102. Signals representative of $f_{ccw}$ and $f_{cw}$ are respectively provided by a CCW resonance tracking servo system 110h and a CW resonance tracking servo system 110g in the coherent light source system 110. The angular rate of rotation 115 about the input axis 117 is an angular rate of rotation, $\Omega$, 115 where $\Omega=(\lambda*\Delta f*P)/(4*A)$, $\lambda$, is substantially equal to the average wavelength of the clockwise optical signal 103a and the counter-clockwise light signal 103b. Further, A is the area enclosed by the optical resonator coil 102 and P is the perimeter of the optical resonator path of the optical resonator coil 102 and resonator loop closure optics system 107.

The coherent light source system 110 generates a clockwise (CW) optical signal 103a and counter-clockwise (CCW) optical signal 103b which are coupled to the optical resonator coil 102 by the optical processing system with power control ports 104. In one embodiment, the CW optical signal 103a and the CCW optical signal 103b are linearly polarized. In another embodiment, the linearly polarized CW optical signal 103a and the linearly polarized CCW optical signal 103b are each substantially linearly polarized in one direction, e.g. horizontal or vertical, or P or S polarized. The direction of polarization is ideally the same for the linearly polarized CW optical signal 103a and the linearly polarized CCW optical signal 103b. Polarized CW optical signal 103a' and polarized CCW optical signal 103b' propagate respectively clockwise and counter-clockwise around the optical resonator coil 102.

The optical processing system with power control ports 104 generates optical feedback signals which are converted to electrical feedback signals by the first photodetector 106a, the second photodetector 106b, the third photodetector 106c, the fourth photodetector 106d, and the fifth photodetector 106e. The first photodetector 106a, the second photodetector 106b, the third photodetector 106c, the fourth photodetector 106d, and the fifth photodetector 106e respectively generate a first feedback signal 105a, a second feedback signal 105b, a third feedback signal 105c, a fourth feedback signal 105d, and a fifth feedback signal 105e which are coupled to the coherent light source system 110.

In the illustrated embodiment, the coherent light source system 110 comprises a PDH servo system 110a, a CW slave optical source 110c, a master optical source 110b, a CCW slave optical source 110d, a CW resonance tracking servo 110g, a CW optical phase lock loop 110e, a CCW optical phase lock loop 110f, a CCW resonance tracking servo system 110h, an optical combiner (combiner) 110i, a CW optical power servo system 110l, a CCW optical power servo system 110m, a CW variable optical attenuator (VOA) 110j, and a CCW VOA 110k. The PDH servo system 110a is configured to receive a first feedback signal 105a, and is coupled to the master optical source 110b and the first photodetector 106a.

The CW resonance tracking servo 110g is configured to receive the third feedback signal 105c, and is coupled to the CW optical phase lock loop 110e and the third photodetector 106c. The CW optical phase lock loop 110e is coupled to the CW slave optical source 110c and the master optical source 110b. The CCW resonance tracking servo system 110h is configured to receive the second feedback signal 105b, and is coupled to the CCW optical phase lock loop 110f and the second photodetector 106b. The CCW optical phase lock loop 110f is coupled to the CCW slave optical source 110d and the master optical source 110b.

The CW optical power servo system 110l is configured to receive the fourth feedback signal 105d, and is coupled to the CW VOA 110j and the fourth photodetector 106d. The CCW optical power servo system 110m is configured to receive the fifth feedback signal 105e, and is coupled to the CCW VOA 110k. The fourth photodetector 106d and the fifth photodetector 106e receive respectively a portion of the CW optical signal 103a' and a portion of the CCW optical signal 103b' circulating in the optical resonator, and convert such optical signals respectively to electrical signals, respectively the fourth feedback signal 105d and the fifth feedback signal 105e. The amplitude of the fourth feedback signal 105d and the fifth feedback signal 105e is indicative of the power levels of respectively the CW optical signal 103a' and the CCW optical signal 103b'. The fourth feedback signal 105d and the fifth feedback signal 105e are respectively received by the CW optical power servo system 110l and the CCW optical power servo system 110m. The CW optical power servo system 110l and the CCW optical power servo system 110m are electrical circuits configured to generate electrical signals to control the attenuation of respectively the CW VOA 110j and the CCW VOA 110k to maintain a constant power level of the CW optical signal 103a' and the CCW optical signal 103b' propagating in the optical resonator 102. Although, a variable optical attenuator is illustrated for pedagogical purposes herein, other devices such as a variable gain optical amplifier can be used in lieu of a variable optical attenuator.

The optical combiner 110i combines a first optical signal 111a emitted from the CW slave optical source 110c and a second optical signal 111b emitted from the master optical source 110b, and forms the CW optical signal 103a. The CCW slave optical source 110d generates the CCW optical signal 103b.

The first feedback signal 105a and the PDH servo system 110a lock the carrier frequency of the second optical signal 111b emitted by the master optical source 110b to a longitudinal resonant frequency or to a frequency that is offset from a longitudinal resonant frequency of the optical resonator by a fixed frequency (offset frequency). The longitudinal resonant frequency equals q multiplied by a free spectral range (FSR) of the optical resonator, where q is an integer. In some embodiments, the carrier frequency of the second optical signal 111b is locked to q times FSR, or in some embodiments it is locked to (q+½)*FSR. The difference between the longitudinal resonance frequency (or resonance frequency) and the corresponding carrier frequency is the frequency offset.

The third feedback signal 105c and the CW resonance tracking servo system 110g and the CW optical phase lock loop 110e lock the carrier frequency of the first optical signal 111a emitted by the CW slave optical source 110c to a resonant frequency or to a frequency that is offset from a CW resonant frequency of the optical resonator by a fixed offset frequency. The CW resonant frequency equals p multiplied by a free spectral range (FSR) of the optical resonator, where p is an integer. In some embodiments, the carrier frequency of the first optical signal 111a is locked to p times FSR, or in some embodiments it is locked to (p+½)*FSR.

The second feedback signal 105b, the CCW resonance tracking servo system 110h, and CCW optical phase lock loop 110f lock the carrier frequency of the CCW optical signal 103b emitted by the CCW slave optical source 110d to a resonant frequency or to a frequency that is offset from a CCW resonant frequency of the optical resonator by a fixed offset frequency. The CCW resonant frequency equals m multiplied by a free spectral range (FSR) of the optical resonator, where m is an integer. In some embodiments, the carrier frequency of the CCW optical signal 103b is locked to m times FSR, or in some embodiments it is locked to (m+½)*FSR. In one embodiment, q, p, and m are different integer numbers.

When the CW and CCW carrier frequencies are both locked to offset frequencies, the frequency offsets from optical resonator resonant frequencies are substantially equal; hence, the difference between the carrier frequencies of the first optical signal 111a and the CCW optical signal 103b are equal to Δf as described above, and rotation rate can be derived from Δf as described above.

In one embodiment, the frequency offsets of the first optical signal 111a and the CCW optical signal 103b are substantially zero frequency. In another embodiment, each frequency offset is substantially one half of a free spectral range of the optical resonator. In all embodiments, the first optical signal 111a, the second optical signal 111b, and CCW optical signal 103b are frequency modulated, e.g. by frequency modulating respectively the CW slave optical source 110c, the master optical source 110b, and the CCW slave optical source 110d, to determine optical resonator resonant frequencies. In one embodiment, modulation frequencies for the CW slave optical source 110c, the master optical source 110b, and the CCW slave optical source 110d are all different, so that the CCW resonance tracking servo system 110h, the CW resonance tracking servo system 110g, and the PDH servo system 110a may distinguish detected optical signals from each of the CW slave optical source 110c, the master optical source 110b, and the CCW slave optical source 110d. The frequency modulation causes each of the first optical signal 111a, the second optical signal 111b, and the CCW optical signal 103b to have a spectrum of frequencies centered about a corresponding carrier frequency.

In embodiments where the carrier frequencies of the first optical signal 111a and the CCW optical signal 103b, respectively emitted by the CW slave optical source 110c and the CCW slave optical source 110d, are locked to a frequency offset of substantially one half free spectral range from a resonant frequency of the optical resonator in the CW and CCW directions respectively, the odd sidebands of the CW slave optical source 110c and the CCW slave optical source 110d are locked onto resonant frequencies in the CW and CCW directions respectively. This condition is substantially the same for measuring rotation rate as the case of locking CW and CCW slave optical source carrier frequencies to CW and CCW resonant frequencies of the optical resonator.

In one embodiment, the carrier frequencies of first optical signal 111a, the second optical signal 111b, and the CCW optical signal 103b are controlled as follows. The carrier frequency of the second optical signal 111b is locked to a resonance or an offset frequency corresponding to the CW direction of the optical resonator as shown in FIG. 1. The photodetector PD1 106a detects an incident optical signal, and generates the corresponding first feedback 105a which is provided to the PDH servo system 110a. The PDH servo system 110a is responsive to a frequency component in first feedback signal 105a that is related to the frequency of modulation applied to the carrier frequency of the master optical source 110b. Portions of the second optical signal 111b, emitted by the master optical source 110b, are respectively coupled to the CW optical phase lock loop 110e and the CCW optical phase lock loop 110f. A portion of the first optical signal 111a, emitted by the CW slave optical source 110c, and a portion of the CCW optical signal 103b, emitted by the CCW slave optical source 110d, are respectively coupled to the CW optical phase lock loop 110e and the CCW optical phase lock loop 110f. The carrier frequency of the first optical signal 111a is locked to the carrier frequency of the second optical signal 111b within a tunable difference frequency of $f_1$ by the CW optical phase lock loop 110e. The carrier frequency of the CCW optical signal is locked to the master carrier frequency within a tunable difference frequency of $f_2$ by the CCW optical phase lock loop 110f. A tunable difference frequency is a frequency within the tuning range of the corresponding servo system. The CW resonance tracking servo system 110g and the CCW resonance tracking servo system 110h control tunable difference frequencies $f_1$ and $f_2$ so that the carrier frequency of the first optical signal 111a is locked to the CW resonance of the optical resonator (or at a frequency offset of substantially one half free spectral range from it) and the carrier frequency of the CCW optical signal 103b is locked to the CCW resonance of the optical resonator (or to a frequency offset of substantially one half free spectral range from it). The tunable difference frequencies $f_1$ and $f_2$ are controlled such that the desirable offset of the CW and CCW carrier frequencies from resonance (e.g., substantially zero or substantially one half free spectral range) are maintained during rotation rate changes, and changing environmental conditions, e.g. temperature and vibrations, that can cause the optical resonator resonances to shift over time.

As shown in FIG. 1, the first optical signal 111a emitted from the CW slave optical source 110c and the second optical signal 111b emitted from the master optical source 110b are combined in optical combiner 110i prior to being coupled to the optical processing system with power control ports 104. Optical combiner 110i may be a bulk optic beam splitter, or a fiber optical direction coupler, or another waveguide directional optical coupler.

In one embodiment, the master optical source 110b, the CW slave optical source 110c and the CCW slave optical source 110d each respectively comprise a LASER. Each optical source may include two or more optical outputs provided, e.g., to the optical resonator and optical phase lock loop(s) and implemented with an optical splitter. One or more optical sources may include a phase modulator to frequency modulate respective LASER(s). One or more optical sources may include intensity (or amplitude) modulators to compensate for phase modulation to amplitude modulation noise in phase modulator(s), to equalize the amplitude levels of the baseband component emitted by the slave optical sources, and to stabilize the second optical signal 111b emitted by the master optical source 110b. Each optical source may include optical isolators to prevent leakage of undesired signal into such sources. In another embodiment, the PDH servo system 110a, the CW resonance tracking servo system 110g, and the CCW resonance tracking servo system 110h are respectively implemented with electronic circuitry.

The coherent light source system 110, or components therein, may include components not shown in FIG. 1. Such components may be used to amplitude and phase modulate optical signals, and to amplify or split optical signals. In one embodiment, such components include variable optical attenuator(s), intensity modulator(s), phase modulator(s), optical amplifier(s), optical isolator(s), and optical passive device(s).

Figure 2A:
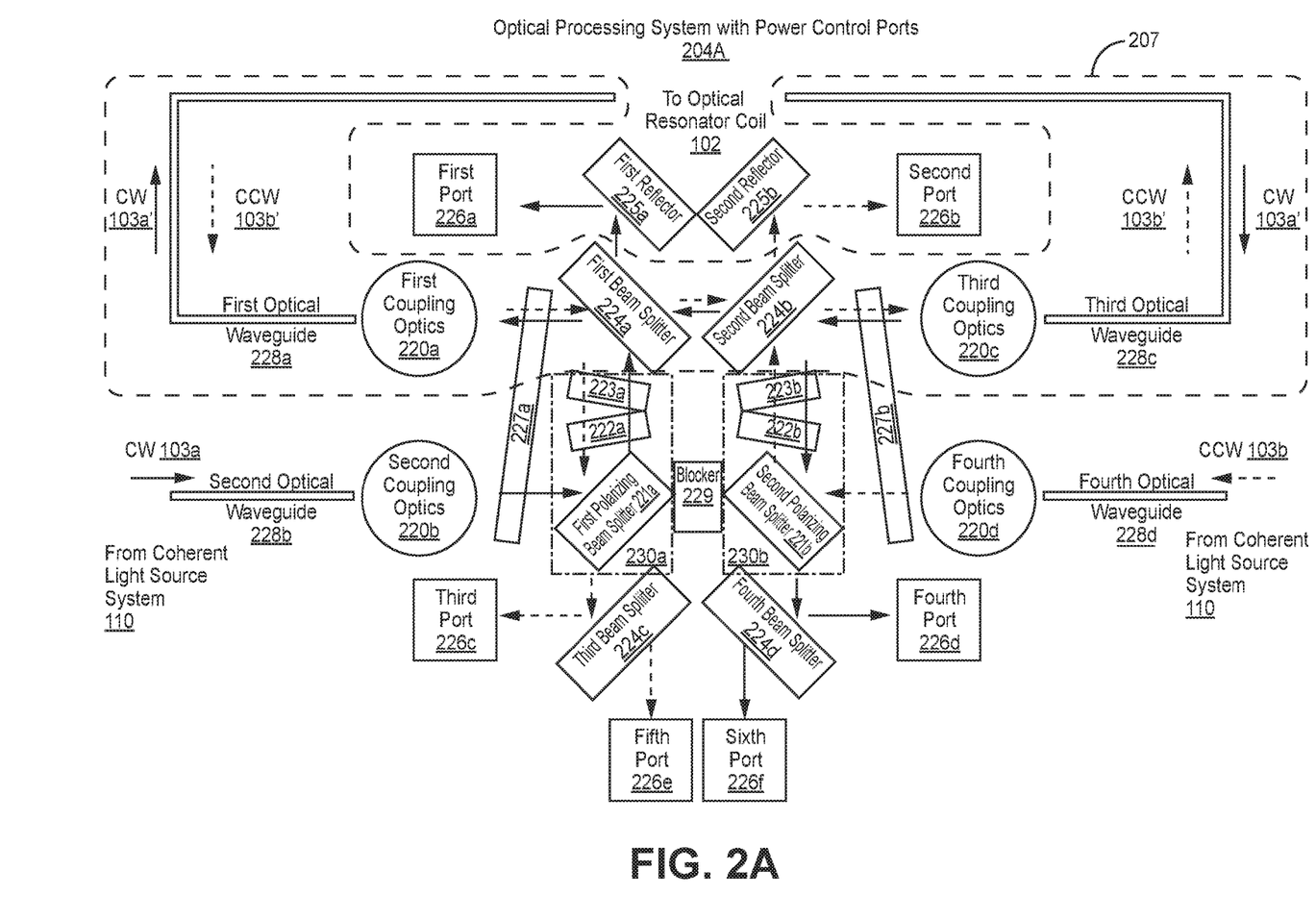
FIG. 2A illustrates one embodiment of the optical processing system with power control ports.

FIG. 2A illustrates one embodiment of the optical processing system with power control ports 204A. Embodiments of optical processing systems with power control ports illustrated herein may also be referred to as "optical benches". However, alternatively, more or fewer components of the optical processing systems 204A, 204B may be included in the corresponding optical bench. Such optical benches can be manufactured en masse using semiconductor processing techniques, e.g. using silicon substrates. Optionally, the second optical waveguide 228b, the fourth optical waveguide 228d, the second coupling optics 220b, and/or the fourth coupling optics 220d may be implemented as shown in FIG. 2A, but would not be integrated into the optical bench comprising the other components illustrated in FIG. 2A.

The illustrated optical processing system with power control ports 204A comprises a first optical waveguide 228a, a second optical waveguide 228b, a third optical waveguide 228c, a fourth optical waveguide 228d, a first coupling optics 220a, a second coupling optics 220b, a third coupling optics 220c, a fourth coupling optics 220d, a first polarizing beam splitter 221a, a second polarizing beam splitter 221b, a first Faraday rotator 222a, a second Faraday rotator 222b, a first half wave plate 223a, a second half wave plate 223b, a first beam splitter 224a, a second beam splitter 224b, a third beam splitter 224c, a fourth beam splitter 224d, a first port 226a, a second port 226b, a third port 226c, a fourth port 226d, a fifth port 226e, and a sixth port 226f.

Optionally, the optical processing system with power control ports 204A includes a first common polarizer 227a and a second common polarizer 227b. For pedagogical purposes, the illustrated optical processing systems with power control ports will include such optional common polarizers. Other common polarizer implementations can be used. For example, if the positions of the first coupling optics 220a and the third coupling optics 220c, and the first port 226a and the second port 226b are reversed, a single common polarizer can be inserted between the first beam splitter 224a and second beam splitter 224b, and the first coupling optics 220a and the third coupling optics 220c.

Optionally, the optical processing system with power control ports 204A includes a first reflector 225a and a second reflector 225b. Such reflectors may be a mirror, or any other device that substantially reflects an optical signal; for example, the first reflector 225a and the second reflector 226a may each be a beam splitter, e.g. reflecting about ninety seven percent of incident optical power and transmitting about three percent of the incident optical power. If a reflector is a beam splitter, then optionally it is a non-polarizing beam splitter. Mirrors may be fabricated from dielectric(s) and/or metal(s).

Each of the optical waveguides 228a, 228b, 228c, 228d may be an optical fiber or a planar, e.g. silicon, waveguide. Each of the coupling optics 220a, 220b, 220c, 220d may be a ball lens or a gradient index lens.

The first port 226a, the second port 226b, the third port 226c, the fourth port 226d, the fifth port 226e, and the sixth port 226f may each be detector collection optics, e.g. a mirror, a prism, or a coupling optics (such as a ball lens) and an optical waveguide, and/or a prism. Alternatively, the detector collection optics is a photodetector, e.g. an angled photodetector to minimize reflections. For pedagogical purposes, detector collection optics coupled to external photodiodes are illustrated herein.

The first port 226a is either detector collection optics coupled to the first photodetector (PD1), or the first photodetector (PD1). The second port 226b is either detector collection optics coupled to a sixth photodetector PD6, or the sixth photodetector PD6. As previously discussed, the sixth photodetector (PD6) (not shown in FIG. 1) is optional. In the event the sixth photodetector (PD6) is not used, optical absorbing or deflecting material may be used in lieu of the second port 226b or the sixth photodetector (PD6).

The third port 226c is either detector collection optics coupled to the second photodetector (PD2), or the second photodetector (PD2). The fourth port 226d is either detector collection optics coupled to the third photodetector (PD3), or the third photodetector (PD3). The fifth port 226e is either detector collection optics coupled to the fifth photodetector (PD5), or the fifth photodetector (PD5). The sixth port 226f is either detector collection optics coupled to the fourth photodetector (PD4), or the fourth photodetector (PD4). The foregoing embodiment is illustrated herein for pedagogical reasons. Alternatively, however, the third port 226c, the fourth port 226d, the fifth port 226e, and the sixth port 226f may be coupled to or comprise respectively the fifth photodetector (PD5), the fourth photodetector (PD4), the second photodetector (PD2), and the third photodetector (PD3). The fifth port 226e and the sixth port 226f may also be referred herein respectively as the first power control port and the second power control port.

The first Faraday rotator 222a and the first half wave plate 223a are in a first optical path and a second optical path between the first beam splitter 224a and the first polarizing beam splitter 221a. The second Faraday rotator 222b and the second half wave plate 223b are in a third optical path and fourth optical path between the second beam splitter 224b and the second polarizing beam splitter 221b. Optionally, the first Faraday rotator 222a and the second Faraday rotator 222b can be replaced by one common Faraday rotator. Optionally, the first half wave plate 223a and the second half wave plate 223b can be replaced by one common half wave plate. The term common Faraday rotator, as used herein, means a single Faraday rotator having sufficient spatial dimensions to act as a Faraday rotator for each of at least two distinct optical signals. The term common half wave plate, as used herein, means a single half wave plate having sufficient spatial dimensions to act as a half wave plate for each of at least two spatially distinct optical signals.

In one embodiment, the resonator loop closure optics system 207 comprises the first optical waveguide 228a, the third optical waveguide 228c, the first coupling optics 220a, the third coupling optics 220c, the first beam splitter 224a, the second beam splitter 224b, the optional first common polarizer 227a, and the optional second common polarizer 227b. The polarized CW optical signal 103a' and the polarized CCW optical signal 103b' propagate through the foregoing components as those signals propagate around the optical resonator. The optical resonator is comprised of the optical resonator coil 102 and the resonator loop closure optics system 107.

The second optical waveguide 228b and the fourth optical waveguide 228d are configured to be optically coupled to the coherent light source system 110, and respectively receive the CW optical signal 103a and the CCW optical signal 103b. Optionally, the CW optical signal 103a and the CCW optical signal 103b received by the second optical waveguide 228b and the fourth optical waveguide 228d are polarized, e.g. S polarized or P polarized. For pedagogical purposes, the CW optical signal 103a and the CCW optical signal 103b received by the second optical waveguide 228b and the fourth optical waveguide 228d will be subsequently described as S polarized optical signals.

The first optical waveguide 228a and the third optical waveguide 228c are configured to be coupled to the optical resonator coil 102. The first optical waveguide 228a is configured to transmit to and receive from the optical resonator coil 102 respectively a polarized CW optical signal 103a' and a polarized CCW optical signal 103b'. The third optical waveguide 228c is configured to respectively transmit to and receive from the optical resonator coil 102 a polarized CCW optical signal 103b' and a polarized CW optical signal 103a'.

The second coupling optics 220b and the fourth coupling optics 220d respectively receive the CW optical signal 103a and the CCW optical signal 103b from the second optical waveguide 228b and the fourth optical waveguide 228d, and collimate and focus the CW optical signal 103a and the CCW optical signal 103b respectively on the first polarizing beam splitter 221a and the second polarizing beam splitter 221b.

The first polarizing beam splitter 221a and the second polarizing beam splitter 221b highly reflect an optical signal having a first polarization, e.g. S or P polarization, and highly transmit (or pass) an optical signal having a second polarization, respectively P or S polarization. In one embodiment, the reflectance coefficient is greater than ninety nine percent. In another embodiment, the reflectance coefficient is greater than ninety eight percent. In a further embodiment, the reflectance coefficient is greater than ninety seven percent. The transmission coefficient of the first polarizing beam splitter 221a and the second polarizing beam splitter 221b is correspondingly small.

Optionally, the illustrated optical processing system with power control ports 204A comprises a blocker 229. The blocker 229 is fabricated from material that suppresses any transmitted optical signals from propagating between the first polarizing beam splitter 221a and the second polarizing beam splitter 221b.

Polarizer, as used herein, means an optical filter that transmits substantially only optical signals of a specific polarization, e.g. for linear polarization: vertical or horizontal polarization, or S or P polarization. The term common polarizer, as used herein, means a single polarizer having sufficient spatial dimensions to polarize each of at least two spatially distinct optical signals. For linear polarization, each of the optional common polarizers 227a, 227b transmits substantially only either S or P polarized light, and substantially attenuates respectively P or S polarized light.

For pedagogical reasons, the illustrated CW optical signal 103a and the CCW optical signal 103b are each substantially linearly S polarized. For pedagogical reasons, the first common polarizer 227a and the second common polarizer 227b will each be illustrated as transmitting substantially respectively an S polarized CW optical signal and an S polarized CCW optical signal. Thus, each of the optional first common polarizer 227a and the optional second common polarizer 227b respectively substantially attenuates a P polarized CW optical signal and a P polarized CCW optical signal, e.g. by about forty to sixty decibels with respect to the corresponding S polarized optical signal. The attenuation provided by each of the optional common polarizers 227a, 227b is desirable because CW optical signal 103a and the CCW optical signal 103b have undesired polarization components, e.g. P polarization components, with power levels which are typically only twenty to twenty five decibels below the power levels of desired polarization components, e.g. S polarization components. The undesired polarization components may give rise to polarization mismatch, and bias error.

The S polarized CW optical signal and the S polarized CCW optical signal, from the first polarizing beam splitter 221a and the second polarizing beam splitter 221b, pass through respectively the first Faraday rotator 222a and the first half wave plate 223a, and the second Faraday rotator 222b and the first half wave plate 223b. Each pair of Faraday rotators and the common half wave plates respectively rotates the polarization of the S polarized optical signals (propagating from a corresponding polarizing beam splitter) by forty-five degrees and then by negative forty-five degrees. As a result, the polarization of the S polarized optical signal is not changed.

The S polarized CW optical signal and the S polarized CCW optical signal, from the first half wave plate 223a and the second half wave plate 223b, are respectively incident upon the first beam splitter 224a and the second beam splitter 224b. In one embodiment, the first beam splitter 224a and the second beam splitter 224b do not discriminate based upon polarization, i.e. are non-polarizing. The first beam splitter 224a and the second beam splitter 224b transmit first portions of respectively of the S polarized CW optical signal 103a and the S polarized CCW optical signal 103b, incident upon corresponding beam splitters, respectively to the first port 226a and the second port 226b (if the optional second port is used). Optionally, such first portions are received from the first beam splitter 224a and the second beam splitter 224b respectively by the optional first reflector 225a and/or the optional second reflector 225b. The optional first reflector 225a and the optional second reflector 225b reflect the portions to the respective first port 226a and the second port 226b. The first portions comprise a relatively large percentage, e.g. about ninety-seven percent, of the power of the respective optical signals incident upon the beam splitters. The second portions (reflected towards the optical resonator coil 102) comprise a relatively small percentage, e.g. about three percent, of the power of the respective optical signals incident upon the beam splitters.

The first beam splitter 224a and the second beam splitter 224b serve as the input and output couplers for the resonator loop closure optics system 207. The second portions of respectively the S polarized CW optical signal and the S polarized CCW optical signal reflected respectively from the first beam splitter 224a and the second beam splitter 224b are directed into the optical resonator, e.g. the resonator loop closure optics system 207. Specifically, the first beam splitter 224a and the second beam splitter 224b transmit second portions of the S polarized CW optical signal and the S polarized CCW optical signal to respectively the first common polarizer 227a, the first coupling optics 220a, and the first optical waveguide 228a, and the second common polarizer 227b, the third coupling optics 220c, and the third optical waveguide 228c. Subsequently, the S polarized CW optical signal and the S polarized CCW optical signal are coupled into the optical resonator coil 102.

The polarized CW optical signal 103a' and the polarized CCW optical signal 103b' propagating around the optical resonator, e.g. the optical resonator coil 102, pass through both the first common polarizer 227a and the second common polarizer 227b. Thus, polarization mismatches between the polarization Eigenstates inside the optical resonator of the RFOG, and the polarizations of respective optical signals being injected into the optical resonator of the RFOG are reduced. As a result, RFOG bias error is reduced due to reducing potentially greater potential polarization mismatches.

The S polarized CW optical signal 103a' propagating through the optical resonator coil 102 passes through the third optical waveguide 228c and the third coupling optics 220c. Upon passing through the second common polarizer 227b, the second beam splitter 224b reflects a first portion of the S polarized CW optical signal 103a' through the second half wave plate 223b, and the second Faraday rotator 222b, to the second polarizing beam splitter 221b. The first portion comprises a relatively small percentage, e.g. between one to ten percent (such as about three percent), of the power of the optical signal incident upon the second beam splitter 224b. A second portion (comprising about ninety-seven percent of the incident power) of the S polarized CW optical signal 103a' is transmitted by the second beam splitter 224b to the first beam splitter 224a, the first coupling optics 220a, the first optical waveguide 228b, and back to the optical resonator coil 102.

When the first portion of the S polarized CW optical 103a' signal propagates from the second beam splitter 224b and passes through the second half wave plate 223b, its polarization is rotated by forty-five degrees. When the first portion of the S polarized rotated CW optical signal passes through the second Faraday rotator 222b, its polarization is rotated by another forty-five degrees (for a total of ninety degrees). As a result, the first portion of the S polarized CW optical signal is transformed into a P polarized CW optical signal. The P polarized CW optical signal is transmitted by the second polarizing beam splitter 221b and is incident upon the fourth beam splitter 224d. The fourth beam splitter 224d reflects a relatively large percentage, e.g. ninety seven percent to ninety nine percent, of the power of the P polarized CW optical signal incident upon the fourth beam splitter 224d. The reflected, P polarized CW optical signal is incident upon the fourth port 226d. The transmitted, P polarized CW optical signal is incident upon the sixth port 226f. Optionally, a reflector may reflect the reflected, P polarized CW optical signal (from the fourth beam splitter 224*d*) to the fourth port 226*d*. Optionally, another reflector may reflect the transmitted, P polarized CW optical signal (from the fourth beam splitter 224*d*) to the sixth port 226*f*.

The S polarized CCW optical signal 103*b*' propagating from the optical resonator coil 102 into the optical processing system with power control ports 204A is analogously processed as described above but by the first optical waveguide 228*a*, the first coupling optics 220*a*, the first beam splitter 224*a*, the second beam splitter 224*b*, the first polarizer 227*a*, the third coupling optics 220*c*, the third optical waveguide 228*c*, the first half wavelength plate 223*a*, the first Faraday rotator 222*a*, the first polarizing beam splitter 221*a*, the third beam splitter 224*c*, the third port 226*c*, and the fifth port 226*e*. Thus, the first portion of the S polarized CCW optical signal (reflected by the first beam splitter 224*a*, and thus emitted by the resonator loop closure optics system 207) is transformed into a P polarized CCW optical signal. Portions of the P polarized CCW optical signal are incident upon the third port 226*c* and the fifth port 226*e*. An optional reflector may also be used to reflect a reflected, P polarized CCW optical signal (from the third beam splitter 224*c*) to the third port 226*c*. Optionally, another reflector may reflect the transmitted, P polarized CCW optical signal (from the third beam splitter 224*c*) to the fifth port 226*e*.

Thus, a portion of the CW optical signal 103*a*' circulating in the optical resonator, e.g. the optical resonator coil 102, is transmitted to the sixth port 226*f*. Also, a portion of the CCW optical signal 103*b*' circulating in the optical resonator, e.g. the optical resonator coil 102, is transmitted to the fifth port 226*e*. Each photodetector in, or optically coupled to, the fifth port 226*e* and sixth port 226*f* generate respectively the fifth feedback signal 105*e* and the fourth feedback signal 105*d*. The fifth feedback signal 105*e* and the fourth feedback signal 105*d* respectively correspond to, e.g. are proportional to, power levels of the CCW optical signal 103*b*' and the CW optical signal 103*a*' circulating in the optical resonator, e.g. the optical resonator coil 102. The fifth feedback signal 105*e* and the fourth feedback signal 105*d* are used to control respectively the optical power levels of the CCW optical signal 103*b*' and the CW optical signal 103*a*', as described above, by adjusting the attenuation levels of variable optical attenuators 110*j*, 110*k* in the optical paths of the CCW optical signal 103*b* and the CW slave optical signal 111*a*.

Figure 2B:
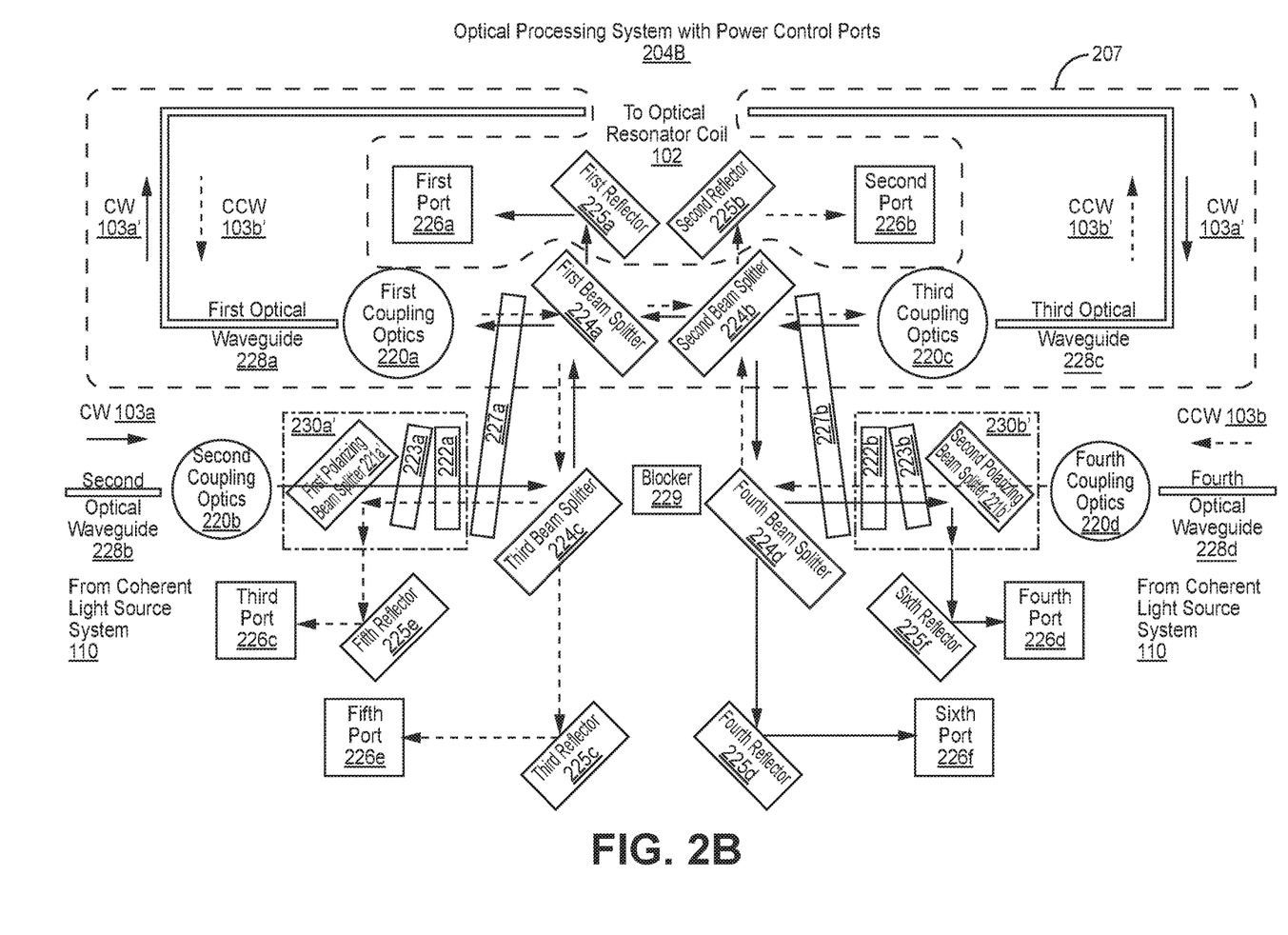
FIG. 2B illustrates another embodiment of an optical processing system with power control ports.

FIG. 2B illustrates another embodiment of an optical processing system with power control ports 204B. This other embodiment is similar to the embodiment illustrated in FIG. 2A, and thus shares some of the same components. The shared components have been described herein with respect to FIG. 2A.

However, in this embodiment, the first circulator 230*a*' and the second circulator 230*b*' are disposed before respectively the first common polarizer 227*a* and the second common polarizer 227*b*; that is optical signals from the coherent light source system 110 propagate though the circulators before propagating through the respective common polarizers. Optionally, the first circulator 230*a*', the second circulator 230*b*', the second optical waveguide 228*b*, the fourth optical waveguide 228*d*, the second coupling optics 220*b*, and/or the fourth coupling optics 220*d* may be implemented as shown in FIG. 2B, but would not be integrated into the optical bench comprising the other components illustrated in FIG. 2B.

In the optical processing system with common polarizers 204A illustrated in FIG. 2A, the first circulator 230*a* and the second circulator 230*b* are disposed after respectively the first common polarizer 227*a* and the second common polarizer 227*b*. That is an optical signal from the coherent light source system 110 propagates though the common polarizers before propagating through the respective circulators.

Returning to FIG. 2B, the first Faraday rotator 222*a* and the first half wave plate 223*a* which are part of the first circulator 230*a*' are in a first optical path between the first polarizing beam splitter 221*a*' and the first common polarizer 227*a*. The second Faraday rotator 222*b* and the second half wave plate 223*b* are in a second optical path between the second polarizing beam splitter 221*b*' and the second common polarizer 227*b*.

The embodiment illustrated in FIG. 2B operates similarly to that embodiment illustrated in FIG. 2A with the following exceptions. The CW optical signal 103*a* and the CCW optical signal 103*b* are each substantially linearly polarized being P polarized. The first polarizing beam splitter 221*a*' and the second polarizing beam splitter 221*b*' of FIG. 2B transmit P polarized optical signals and reflect S polarized optical signals. However, in other embodiments, the above described polarizations in FIGS. 2A and 2B can be reversed; however, this may require the positions or the faces (upon which optical signals are incident) of the corresponding Faraday rotators and half wave plates to be reversed, and the polarizers oriented to pass the P polarized optical polarization.

As a result, the first circulator 230*a*' and the second circulator 230*b*' of FIG. 2B are also different than the first circulator 230*a* and the second circulator 230*b* of FIG. 2A: the positions of the first Faraday rotator 222*a* and the second Faraday rotator 222*b* are respectively reversed with the first half wave plate 223*a* and the second half wave plate 223*b*. In the first circulator 230*a*' and the second circulator 230*b*', the first Faraday rotator 222*a* and the second Faraday rotator 222*b* respectively follow or go after the first half wave plate 223*a* and the second half wave plate 223*b*, rather than precede those components. Alternatively, the positions of each pair of Faraday rotator and half wave plate are not reversed, but a face (upon which optical signals are incident) of one of such components is reversed.

As a result, a P polarized CW optical signal 103*a* is transmitted through the first polarizing beam splitter 221*a*' and transformed into a S polarized CW optical signal by the first half wave plate 223*a* and the first Faraday rotator 222*a*. The first half wave plate 223*a* and the first Faraday rotator 222*a* each rotate the P polarized CW optical signal 103*a* by forty-five degrees for a total of ninety degrees. The S polarized CW optical signal propagates through and is filtered by the first common polarizer 227*a*, and reflected by the third beam splitter 224*c* to the first beam splitter 224*a*. A first portion of the S polarized CW optical signal is reflected by the first beam splitter 224*a*, and propagates through and is filtered by the first common polarizer 227*a* before entering the optical resonator coil 102. The P polarized CCW optical signal 103*b* is analogously processed by the second polarizing beam splitter 221*b*, second half wave plate 223*b*, and the second Faraday rotator 222*b*.

The S polarized CCW optical signal 103*b*', circulating through the optical resonator coil 102 is filtered by the first common polarizer 227*a*. A portion of the filtered, S polarized CCW optical signal is reflected by the first beam splitter 224*a* to the third beam splitter 224*c*. The third beam splitter 224*c* reflects a first portion of the filtered, S polarized CCW optical signal, which is then filtered again by the first common polarizer 227*a*.

The S polarized CCW optical signal passes through the first Faraday rotator 222*a* and the first half wave plate 223*a*. The first Faraday rotator 222*a* and the first half wave plate 223a rotate the polarization of the S polarized CCW optical signal by forty-five degrees and then negative forty-five degrees. As a result, the polarization of the S polarized optical signal is unchanged. The S polarized optical CCW optical signal is reflected by the first polarizing beam splitter 221a'. Optionally, the reflected S polarized CCW optical signal may be reflected by an optional fifth reflector 225e to the third port 226c. Alternatively, the reflected S polarized CCW optical signal is directed, without the use of the optional fifth reflector 225e, to the third port 226c.

A second portion of the S polarized CCW optical signal is transmitted by the third beam splitter 224c. Optionally, the transmitted second portion of the S polarized CCW optical signal is reflected by an optional third reflector 225c to the fifth port 226e. Alternatively, the transmitted second portion of the S polarized CCW optical signal is directed, without the use of the optional fifth reflector 225e, to the third port 226c.

The other half of the optical processing system with common polarizers 204B, including the second circulator 230b', operates analogously as described above but with respect to the second portion of the S polarized CW optical signal. The other half includes the second beam splitter 224b, the fourth beam splitter 224d, the second common polarizer 227b, the second circulator 230b' (and the components therein), an optional fourth reflector 225f, an optional sixth reflector 225f, a fourth port 226d, and the sixth port 226f.

The sixth port 226f includes or is coupled to the fourth photodiode (PD4) 106d. The fifth port 226e includes or is coupled to the fifth photodiode (PD5) 106e. The fourth photodiode (PD4) 106d and the fifth photodiode (PD5) 106e generate respectively the fourth feedback signal 105d and the fifth feedback signal 105e. The fourth feedback signal 105d and the fifth feedback signal 105e are used to control optical power as described above. Optical processing systems with ports for power control may be implemented differently than the embodiments illustrated in FIGS. 2A and 2B. Further, device(s), other than optical waveguides and coupling optics may be used to couple optical signals, e.g. to the common polarizers.

Operation of an exemplary RFOG with an optical processing system with power control ports will now be further described. A method to control the power of each of the CW optical signal 103a' and the CCW optical signal 103b', propagating in the optical resonator, will be exemplified.

Figure 3:
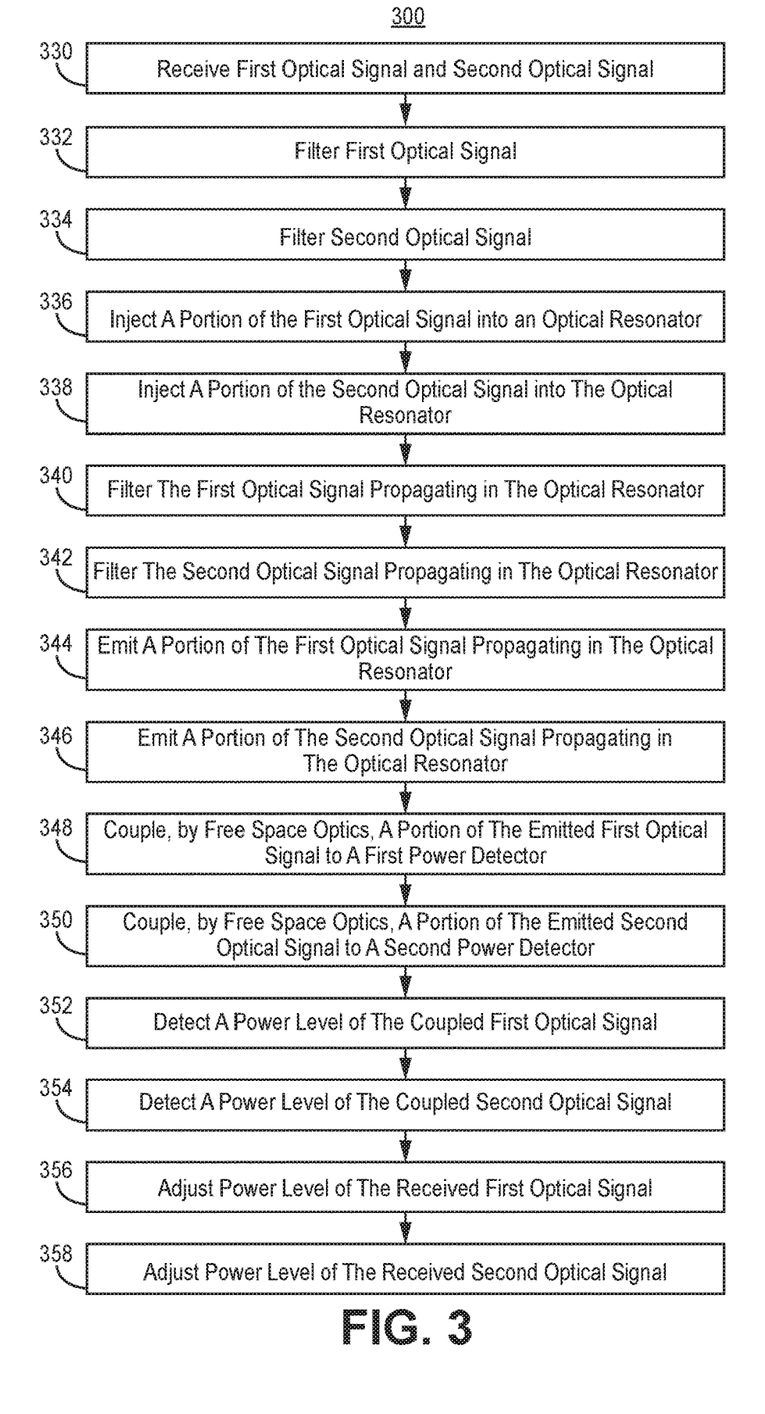
FIG. 3 illustrates an exemplary method of diminishing bias error in a resonant fiber optic gyroscope.

FIG. 3 illustrates an exemplary method 300 of diminishing bias error in an RFOG. To the extent the method 300 shown in FIG. 3 is described herein as being implemented in the system shown in FIGS. 1-2B, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 330, receive a first optical signal and a second optical signal, e.g. from the coherent light source system 110. In one embodiment, each of the first optical signal and the second optical signal comprises a first polarization component, e.g. P or S polarization, and a second polarization component, e.g. S or P polarization, where the first polarization component has a different polarization and a substantially larger power level than respectively the polarization and the power level of second polarization component. In another embodiment, the power level of the second polarization component is many decibels (e.g. 20-25 dB) less than the power level of the first polarization component.

Alternatively, the first optical signal and the second optical signal have first polarization components having different polarizations and second polarization components having different polarizations. If so, then also transform the first polarization component of the second optical signal so that it has the same polarization as the first optical signal, e.g. before the second optical signal is incident upon a common polarizer.

Optionally, in block 332, filter the first optical signal with a polarizer, e.g. a first common polarizer, having a first polarization, i.e. to increase the relative power level of the polarization component having the first polarization with respect to the other polarization component having a different polarization. Optionally, in block 334, filter the second optical signal with a polarizer, e.g. a second common polarizer, having a first polarization, i.e. to increase the relative power level of the polarization component having the first polarization with respect to the other polarization component having a different polarization. The filtering in blocks 332 and 334 is performed prior to the injection of blocks 336 and 338.

In block 336, inject a portion of the first optical signal (which optionally may have been filtered) into an optical resonator so that the first optical signal propagates in a first direction through the optical resonator. In block 338, inject a portion of the second optical signal (which optionally may have been filtered) into the optical resonator so that the second optical signal propagates in a second direction through the optical resonator, which is opposite to the first direction.

Optionally, in block 340, filter, e.g. with the first common polarizer, the first optical signal propagating in a first direction in the optical resonator. Optionally, in block 342, filter, e.g. with the second common polarizer, the second optical signal propagating in a second direction in the optical resonator.

In block 344, emit a portion of the first optical signal propagating in the first direction in the optical resonator. In block 346, emit a portion of the second optical signal propagating in a second direction in the optical resonator. In block 348, couple, by free space optics, a portion of the emitted first optical signal to a first power detector. In block 350, couple, by free space optics, a portion of the emitted second optical signal to a second power detector. In block 352, detect, with the first power detector, a power level of at least a portion of the coupled first optical signal. In block 354, detect, with the second power detector, a power level of at least a portion of the coupled second optical signal. In block 356, adjust the power level of the received first optical signal. In block 358, adjust the power level of the received second optical signal.

EXEMPLARY EMBODIMENTS

Example 1 includes a system, comprising: a first beam splitter optically coupled to a first port of an optical resonator coil; a second beam splitter optically coupled to a second port of the optical resonator coil; a third beam splitter optically coupled to the first beam splitter; a fourth beam splitter optically coupled to the second beam splitter; a first power control port coupled by free space optics to the third beam splitter; a second power control port coupled by free space optics to the fourth beam splitter; wherein the first beam splitter is configured to received a first optical signal from a coherent light source system; wherein the second beam splitter is configured to receive a second optical signal from the coherent light source system; wherein the power level of the first optical signal depends upon the power level of an optical signal incident upon the second power control port; and wherein the power level of the second optical signal depends upon a power level of an optical signal incident upon the first power control port.

Example 2 includes the system of Example 1, wherein each of the first power control port and the second power control port comprises a photodetector.

Example 3 includes the system of any of Examples 1-2, wherein the power level of the first optical signal is controlled by a first variable optical attenuator coupled to the second power control port; and wherein the power level of the second optical signal is controlled by a second optical attenuator coupled to the first power control port.

Example 4 includes the system of any of Examples 1-3, wherein a first optical circulator is coupled between the first beam splitter and the third beam splitter; and wherein a second optical circulator is coupled between the second beam splitter and the fourth beam splitter.

Example 5 includes the system of any of Examples 1-4, wherein a first optical circulator is coupled between the first beam splitter, the third beam splitter, and first coupling optics; and wherein a second optical circulator is coupled between the second beam splitter, the fourth beam splitter, and second coupling optics.

Example 6 includes the system of any of Examples 1-5, further comprising: a first port optically coupled to the first beam splitter; a second port optically coupled to the third beam splitter; and a third port optically coupled to the fourth beam splitter.

Example 7 includes the system of Example 6, wherein each of the first port, the second port, and the third port comprises a photodetector.

Example 8 includes the system of any of Examples 1-7, further comprising: a first common polarizer between the first port of the optical resonator coil and the first beam splitter, and between first coupling optics and the first beam splitter; and a second common polarizer between the second port of the optical resonator coil and the second beam splitter, and between second coupling optics and the second beam splitter.

Example 9 includes a system, comprising: an optical resonator coil having a first port and a second port optically; a coherent light source system comprising at least two optical sources, and configured to generate a first optical signal and a second optical signal; a first beam splitter optically coupled to the first port of an optical resonator coil; a second beam splitter optically coupled to a second port of the optical resonator coil; a third beam splitter optically coupled to the first beam splitter; a fourth beam splitter optically coupled to the second beam splitter; a first power control port coupled by free space optics to the third beam splitter; a second power control port coupled by free space optics to the fourth beam splitter; wherein the first beam splitter is configured to receive the first optical signal; wherein the second beam splitter is configured to receive the second optical signal; wherein the power level of the first optical signal depends upon the power level of an optical signal incident upon the second power control port; and wherein the power level of the second optical signal depends upon a power level of an optical signal incident upon the first power control port; and a processing system coupled to the coherent light source system.

Example 10 includes the system of Example 9, wherein each of the first power control port and the second power control port comprises a photodetector.

Example 11 includes the system of any of Examples 9-10, further comprising a first variable optical attenuator which controls the power level of the first optical signal and is coupled to the second power control port; and a second optical attenuator which controls the power level of the second optical signal is coupled to the first power control port.

Example 12 includes the system of any of Examples 9-11, wherein a first optical circulator is coupled between the first beam splitter and the third beam splitter; and wherein a second optical circulator is coupled between the second beam splitter and the fourth beam splitter.

Example 13 includes the system of any of Examples 9-12, wherein a first optical circulator is coupled between the first beam splitter, the third beam splitter, and first coupling optics; and wherein a second optical circulator is coupled between the second beam splitter, the fourth beam splitter, and second coupling optics.

Example 14 includes the system of any of Examples 9-13, further comprising: a first port optically coupled to the first beam splitter; a second port optically coupled to the third beam splitter; and a third port optically coupled to the fourth beam splitter.

Example 15 includes the system of Example 14, wherein each of the first port, the second port, and the third port comprises a photodetector.

Example 16 includes the system of any of Examples 9-15, further comprising: a first common polarizer between the first port of the optical resonator coil and the first beam splitter, and between first coupling optics and the first beam splitter; and a second common polarizer between the second port of the optical resonator coil and the second beam splitter, and between second coupling optics and the second beam splitter.

Example 17 includes a method, comprising: receiving a first optical signal and a second optical signal; injecting a portion of the first optical signal into an optical resonator so that the portion of the first optical signal propagates in a first direction through the optical resonator; injecting a portion of the second optical signal into the optical resonator so that the portion of the second optical signal propagates in a second direction through the optical resonator, which is opposite to the first direction; emitting a portion of the first optical signal propagating in the first direction in the optical resonator; emitting a portion of the second optical signal propagating in the second direction in the optical resonator; coupling, by free space optics, a portion of the emitted first optical signal to a first power detector; coupling, by free space optics, a portion of the emitted second optical signal to a second power detector; detecting, with the first power detector, a power level of at least a portion of the coupled first optical signal; detecting, with the second power detector, a power level of at least a portion of the coupled second optical signal; adjusting the power level of the received first optical signal; and adjusting the power level of the received second optical signal.

Example 18 includes the method of Example 17 further comprising polarization filtering the first optical signal propagating around the optical resonator; and polarization filtering the second optical signal propagating around the optical resonator.

Example 19 includes the method of any of Examples 17-18, further comprising: polarization filtering the first optical signal prior to injecting the first optical signal into the optical resonator; and polarization filtering the second optical signal prior to injecting the first optical signal into the optical resonator.

Example 20 includes the method of any of Examples 17-19, wherein each of the first optical signal and the second optical signal comprises a first polarization component and a second polarization component, where the first polarization component has a different polarization and a substantially larger power level than respectively a polarization and a power level of the second polarization component.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected.

The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Terms of relative position as used in this application are defined based on a plane parallel to, or in the case of the term coplanar—the same plane as, the conventional plane or working surface of a device, wafer, or substrate, regardless of orientation. The term "horizontal" or "lateral" as used in this application are defined as a plane parallel to the conventional plane or working surface of a device, wafer, or substrate, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of device, wafer, or substrate, regardless of orientation. The term "coplanar" as used in this application is defined as a plane in the same plane as the conventional plane or working surface of a device, wafer, or substrate, regardless of orientation.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

The invention claimed is:

1. A system, comprising:
a first beam splitter optically coupled to a first port of an optical resonator coil;
a second beam splitter optically coupled to a second port of the optical resonator coil;
a third beam splitter optically coupled to the first beam splitter;
a fourth beam splitter optically coupled to the second beam splitter;
a first power control port coupled by free space optics to the third beam splitter;
a second power control port coupled by free space optics to the fourth beam splitter;
wherein the first beam splitter is configured to received a first optical signal from a coherent light source system;
wherein the second beam splitter is configured to receive a second optical signal from the coherent light source system;
wherein the power level of the first optical signal depends upon the power level of an optical signal incident upon the second power control port; and
wherein the power level of the second optical signal depends upon a power level of an optical signal incident upon the first power control port.

2. The system of claim 1, wherein each of the first power control port and the second power control port comprises a photodetector.

3. The system of claim 1, wherein the power level of the first optical signal is controlled by a first variable optical attenuator coupled to the second power control port; and
wherein the power level of the second optical signal is controlled by a second optical attenuator coupled to the first power control port.

4. The system of claim 1, wherein a first optical circulator is coupled between the first beam splitter and the third beam splitter; and
wherein a second optical circulator is coupled between the second beam splitter and the fourth beam splitter.

5. The system of claim 1, wherein a first optical circulator is coupled between the first beam splitter, the third beam splitter, and first coupling optics; and
wherein a second optical circulator is coupled between the second beam splitter, the fourth beam splitter, and second coupling optics.

6. The system of claim 1, further comprising:
a first port optically coupled to the first beam splitter;
a second port optically coupled to the third beam splitter; and
a third port optically coupled to the fourth beam splitter.

7. The system of claim 6, wherein each of the first port, the second port, and the third port comprises a photodetector.

8. The system of claim 1, further comprising:
a first common polarizer between the first port of the optical resonator coil and the first beam splitter, and between first coupling optics and the first beam splitter; and
a second common polarizer between the second port of the optical resonator coil and the second beam splitter, and between second coupling optics and the second beam splitter.

9. A system, comprising:
an optical resonator coil having a first port and a second port optically;

a coherent light source system comprising at least two optical sources, and configured to generate a first optical signal and a second optical signal;
a first beam splitter optically coupled to the first port of an optical resonator coil;
a second beam splitter optically coupled to a second port of the optical resonator coil;
a third beam splitter optically coupled to the first beam splitter;
a fourth beam splitter optically coupled to the second beam splitter;
a first power control port coupled by free space optics to the third beam splitter;
a second power control port coupled by free space optics to the fourth beam splitter;
wherein the first beam splitter is configured to receive the first optical signal;
wherein the second beam splitter is configured to receive the second optical signal;
wherein the power level of the first optical signal depends upon the power level of an optical signal incident upon the second power control port; and
wherein the power level of the second optical signal depends upon a power level of an optical signal incident upon the first power control port; and
a processing system coupled to the coherent light source system.

10. The system of claim 9, wherein each of the first power control port and the second power control port comprises a photodetector.

11. The system of claim 9, further comprising a first variable optical attenuator which controls the power level of the first optical signal and is coupled to the second power control port; and
a second optical attenuator which controls the power level of the second optical signal is coupled to the first power control port.

12. The system of claim 9, wherein a first optical circulator is coupled between the first beam splitter and the third beam splitter; and
wherein a second optical circulator is coupled between the second beam splitter and the fourth beam splitter.

13. The system of claim 9, wherein a first optical circulator is coupled between the first beam splitter, the third beam splitter, and first coupling optics; and
wherein a second optical circulator is coupled between the second beam splitter, the fourth beam splitter, and second coupling optics.

14. The system of claim 9, further comprising:
a first port optically coupled to the first beam splitter;
a second port optically coupled to the third beam splitter; and
a third port optically coupled to the fourth beam splitter.

15. The system of claim 14, wherein each of the first port, the second port, and the third port comprises a photodetector.

16. The system of claim 9, further comprising:
a first common polarizer between the first port of the optical resonator coil and the first beam splitter, and between first coupling optics and the first beam splitter; and
a second common polarizer between the second port of the optical resonator coil and the second beam splitter, and between second coupling optics and the second beam splitter.

17. A method, comprising:
receiving a first optical signal and a second optical signal;
injecting a portion of the first optical signal into an optical resonator so that the portion of the first optical signal propagates in a first direction through the optical resonator;
injecting a portion of the second optical signal into the optical resonator so that the portion of the second optical signal propagates in a second direction through the optical resonator, which is opposite to the first direction;
emitting a portion of the first optical signal propagating in the first direction in the optical resonator;
emitting a portion of the second optical signal propagating in the second direction in the optical resonator;
coupling, by free space optics, a portion of the emitted first optical signal to a first power detector;
coupling, by free space optics, a portion of the emitted second optical signal to a second power detector;
detecting, with the first power detector, a power level of at least a portion of the coupled first optical signal;
detecting, with the second power detector, a power level of at least a portion of the coupled second optical signal;
adjusting the power level of the received first optical signal; and
adjusting the power level of the received second optical signal.

18. The method of claim 17 further comprising polarization filtering the first optical signal propagating around the optical resonator; and
polarization filtering the second optical signal propagating around the optical resonator.

19. The method of claim 17, further comprising:
polarization filtering the first optical signal prior to injecting the first optical signal into the optical resonator; and
polarization filtering the second optical signal prior to injecting the first optical signal into the optical resonator.

20. The method of claim 17, wherein each of the first optical signal and the second optical signal comprises a first polarization component and a second polarization component, where the first polarization component has a different polarization and a substantially larger power level than respectively a polarization and a power level of the second polarization component.

* * * * *